Figure 1:
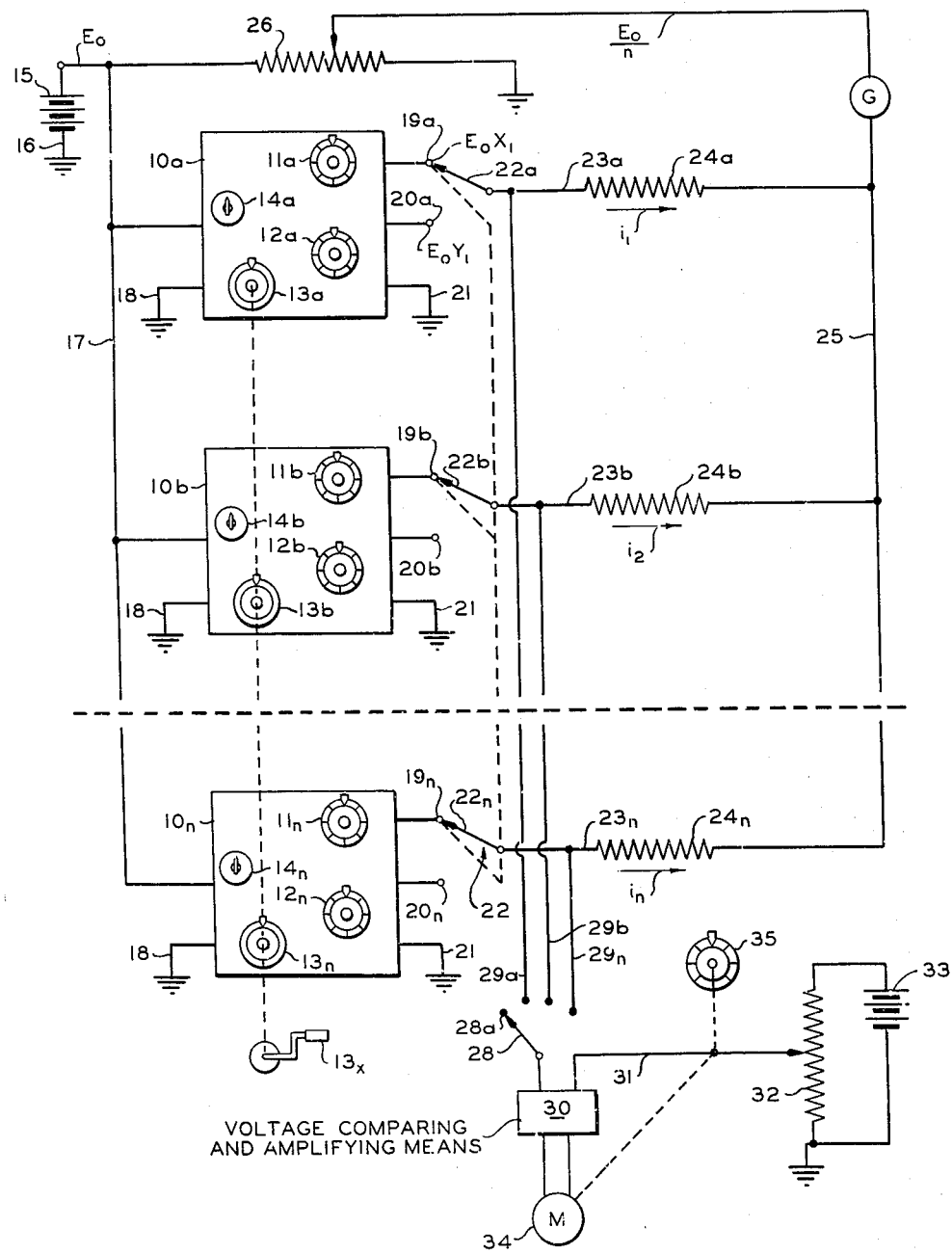

Aug. 30, 1960     F. W. BUBB     2,950,862
COMPUTER

Original Filed June 9, 1950     2 Sheets-Sheet 1

INVENTOR.
FRANK W. BUBB
BY Hudson & Young
ATTORNEYS

Aug. 30, 1960  F. W. BUBB  2,950,862
COMPUTER
Original Filed June 9, 1950  2 Sheets-Sheet 2

*INVENTOR.*
FRANK W. BUBB
BY *Hudson & Young*
ATTORNEYS

United States Patent Office 2,950,862
Patented Aug. 30, 1960

2,950,862
COMPUTER

Frank W. Bubb, Webster Groves, Mo., assignor to Phillips Petroleum Company, a corporation of Delaware Original application June 9, 1950, Ser. No. 167,129, now Patent No. 2,713,457, dated July 19, 1955. Divided and this application Oct. 8, 1954, Ser. No. 461,068

10 Claims. (Cl. 235—180)

This invention relates to computers. In one specific aspect, it relates to vapor-liquid equilibrium computers. In another specific aspect, it relates to electrical circuits for carrying out the computing operations.

This application is a division of my copending application, Serial No. 167,129, filed June 9, 1950, now Patent No. 2,713,457.

In many practical operations in refining, chemical, and other industries, it is of great importance to determine the composition and amount of liquid and vapor phases in a vapor-liquid equilibrium mixture. In general, the overall composition and total quantity of the mixture are known, from which data the total number of mols in the mixture and the total mol fraction of each component in the mixture may readily be calculated. Furthermore, the equilibrium constant for each component at the particular temperature and pressure involved are either known or may be calculated readily from known data. The computer of this invention, upon being supplied the equilibrium constant of each component at the temperature and pressure involved, the total mol fraction of each component in the mixture, and the total number of mols in the mixture, calculates the mol fraction of each component in the liquid phase, the mol fraction of each component in the vapor phase, and the total number of mols of the mixture in the vapor phase or in the liquid phase. Once the mol fractions are known, the parts by weight or percentage of each component in the gas and liquid phases may easily be determined, if it is necessary to do so.

The computer circuits described herein, however, are not restricted to the solution of the vapor-liquid equilibrium problem but may be utilized to solve many equations of similar form. Moreover, certain improved features of my computer are applicable to computers solving diversified problems not closely related to the solution of the vapor-liquid equilibrium problem.

It is an object of the invention to provide an improved computer suitable for solving the vapor-liquid equilibrium problem.

It is a further object to provide electrical computing circuits applicable both to the vapor-liquid equilibrium problem and to other diversified problems in the computer art.

It is a still further object to provide apparatus which is rapid and reliable in operation, of rugged construction, and which utilizes a minimum number of circuit components.

Figure 2:
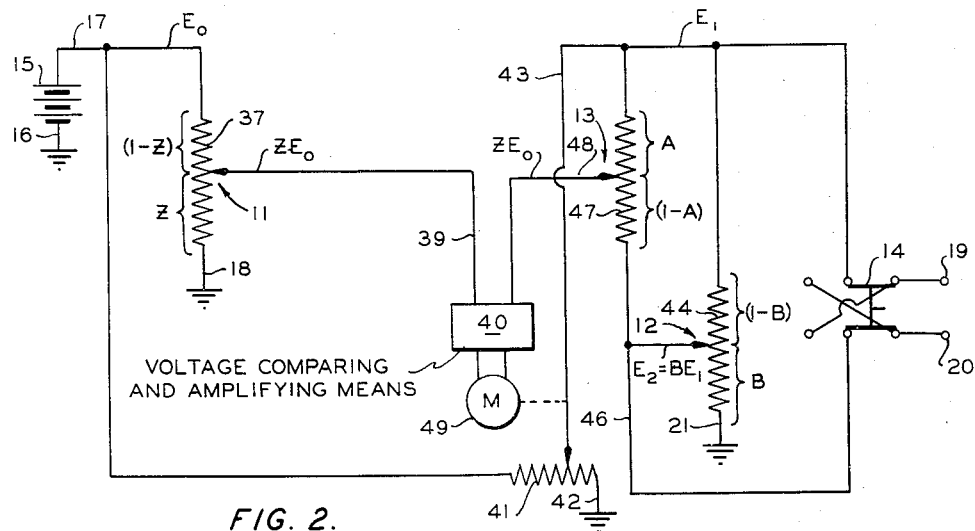
Figure 3:
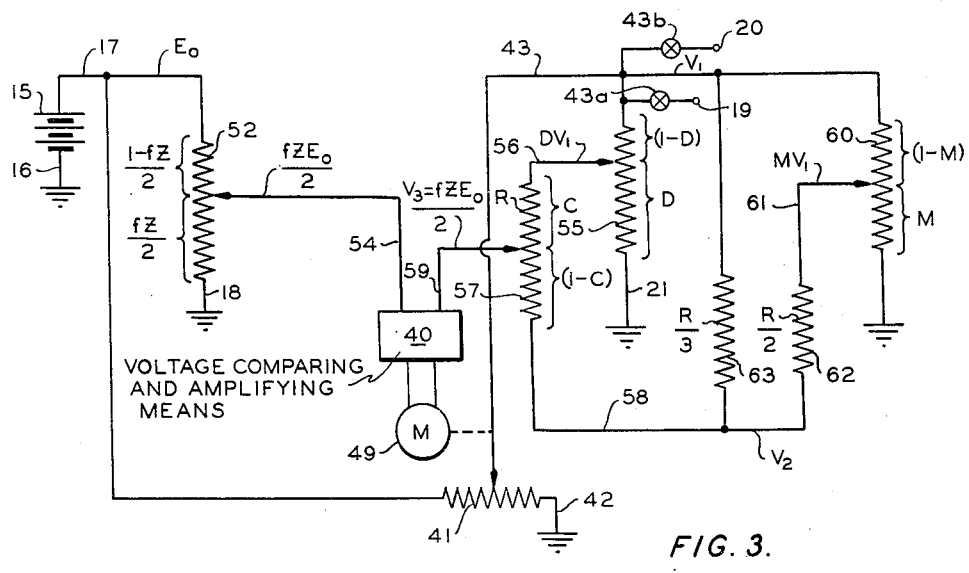
Figure 4:
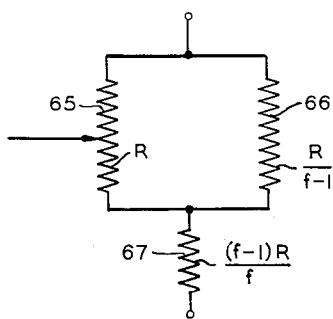

Various other objects, advantages and features of the invention will become apparent from the following detailed description taken in conjunction with the accompanying drawings, in which:

Figure 1 is a block diagram of the computer assembly;
Figure 2 is a schematic circuit diagram of one of the computing units of Figure 1;
Figure 3 is a schematic circuit diagram of a modified computer unit suitable for use in the apparatus of Figure 1; and Figure 4 is a schematic diagram of a circuit for increasing the spread of a potentiometer over a preselected part of its range.

In a vapor-liquid mixture containing several components, each component does not behave independently of the other components as regards its distribution between the gas and liquid phases. In particular, the following relationships hold for each component in the vapor-liquid mixture:

$$x_1 = \frac{Z_1}{1+v(K_1-1)} \quad (1)$$

$$y_1 = \frac{K_1 Z_1}{1+v(K_1-1)} \quad (2)$$

where $x_1$ represents the mol fraction of a component in the liquid phase, $y_1$ represents the mol fraction of said component in the vapor phase, $v$ is the total mol fraction of vapor in the entire mixture, $Z_1$ is the total mol fraction of the component in the entire mixture, and $K_1$ is the equilibrium constant of the component at the temperature and pressure under consideration. Evidently, for a mixture containing several components, the sum of the mol fractions in the liquid phase is 1 and, similarly, the sum of the mol fractions in the vapor phase is 1. That is, $$x_1+x_2+\ldots+x_n=1 \quad (3)$$

and $$y_1+y_2+\ldots+y_n=1 \quad (4)$$

where there are $n$ components in the mixture.

In carrying out my invention, a plurality of computer units $10a$, $10b$, . . . is provided, one for each component in the mixture. The total mol fractions $Z_1$, $Z_2$, . . ., $Z_n$ of the respective components are set upon dials $11a$, $11b$, . . ., $11n$, the mol fraction of the first component being set on dial $11a$, the mol fraction of the second component being set on dial $11b$, and the mol fractions of the remaining components being set on dials $11c$ to $11n$, respectively. In similar fashion, the equilibrium constants $K_1$, $K_2$, . . ., $Kn$ are set upon dials $12a$, $12b$, . . ., $12n$, the constant for the first component being set upon dial $12a$, the constant for the second component being set upon the dial $12b$, and the constants for the remaining components being set upon dials $12c$ to $12n$, respectively. The computer units $10$ are also provided with dials $13a$, $13b$, . . ., $13n$ which are ganged and movable as a unit by a crank $13x$, the setting of these dials being representative of $v$, the total mol fraction of vapor in the mixture. Finally, the computer units are provided with reversing switches $14a$, $14b$, . . ., $14n$, the function of which will be explained hereafter.

A constant voltage is supplied to each computer unit $10$ by a battery or other voltage source $15$, one terminal of the battery being grounded at $16$ and the other terminal being connected by a common conductor $17$ to the respective computer units, the battery circuit being completed for each computer unit by a ground lead $18$.

In a preferred embodiment of the invention, the computer units produce outputs at terminals $19a$, $19b$, . . ., $19n$ equal to the product of the battery voltage $E_0$ and the mol fraction of the component under consideration in the liquid phase. Thus, for example, the voltage at terminal $19a$ may be represented by $E_0 x_1$, and the voltage at terminal $19n$ may be represented by $E_0 x_n$. Each such output voltage represents the relationship shown in Equation (1) between the variables determining the mol fraction of the component in the liquid phase, this result being accomplished by the circuits shown in Figures 2 and 3, which will be described hereinafter in detail. Moreover, the computer units produce voltages at output terminals 20a, 20b, ..., 20n, respectively, which are equal to the product of the battery voltage and the mol fractions of the respective components in the vapor phase. Thus, for example, the voltage at terminal 20a may be represented by $E_0 y_1$, and the voltage at terminal 20n may be represented by $E_0 y_n$. It will be understood that these voltages are taken with reference to a ground connection, as indicated at 21.

A multi-gang switch 22 is provided to connect selectively the terminals 19 and 20 to the respective leads 23a, 23b, ..., 23n, these leads being connected through resistances 24a, 24b, ..., 24n, respectively, to a common conductor 25. The individual resistances 24 are all of equal ohmic value, and this ohmic value is substantially higher than the resistances of the circuits making up the computer units 10. When I speak of these resistances as having a high ohmic value, I mean sufficiently high that the current flow therethrough is negligible, whereby this current does not disturb the voltages existing at various points within the computer units, within prescribed limits of accuracy. The common conductor 25 is connected through a galvanometer G to the contactor of a potentiometer 26, one fixed terminal of which is grounded, and the other fixed terminal of which is connected to the ungrounded side of battery 15.

In the operation of the circuit of Figure 1, potentiometer 26 is adjusted so that a voltage $$\frac{E_0}{n}$$

is applied to one terminal of galvanometer G. Thereupon, crank 13x is adjusted until a null reading is obtained on the galvanometer. It will be understood that the described adjustment of crank 13x changes the value of $v$ in each of the computer units, the settings representing K and Z remaining unchanged. When a zero reading of the galvanometer is obtained, conductor 25 is also at the potential $$\frac{E_0}{n}$$

When the circuit is thus balanced, the voltage drop across resistor 24a is $$E_0 x_1 - \frac{E_0}{n}$$

which equals $i_1 r$, the product of the current $i_1$ through resistor 24a and its resistance $r$.

Adding these relationships for each of the resistors 24a, 24b, ..., 24n, it is evident that $$E_0(x_1 + x_2 + \ldots + x_n) - \frac{nE_0}{n} = r(i_1 + i_2 + \ldots + i_n)$$

Since the circuit is balanced, the sum of the currents $(i_1 + i_2 + \ldots + i_n)$ equals zero, with the result that $(x_1 + x_2 + \ldots + x_n) = 1$. That is, when the crank 13x is turned to the proper value of $v$, the circuit is balanced and the sum of the mol fractions of the various components in the liquid phase is equal to unity. Accordingly, the value of $v$ satisfies Equation (3), and the potentials $E_0 x$ correctly represent the mol fractions of the respective components in the liquid phase. Similarly, when switch 22 is moved into engagement with the terminals 20 and crank 13x is adjusted until the circuit is balanced, the same value of $v$ is found to satisfy Equation (4) and the potentials $E_0 y$ correctly represent the mol fractions of the components in the vapor phase.

Assuming that the circuit has been balanced with switch 22 in its upper position, the value of $v$ is read from any one of the dials 13. I also provide a servomechanism unit for reading the values of $x_1, x_2, \ldots x_n$. This unit includes a switch 28 having an unconnected contact point 28a and having other contact points connected to leads 23a, 23b, ..., 23n by conductors 29a, 29b, ..., 29n, respectively. The arm of switch 28 is connected to the input circuit of a voltage comparing and amplifying means 30, this input circuit also being connected by a lead 31 to the contactor of a potentiometer 32, the fixed terminals of which are connected to a battery 33. Voltage comparing means 30 can be of the form shown in Electronic Control Handbook, Batcher and Moulic, p. 298, for example. Terminals A, A of Figure 13–V of this reference correspond to terminals 28 and 31 of Figure 1. A motor 34, driven by the output of means 30, is mechanically coupled to the arm of potentiometer 32 and causes movement of this arm to a position where the voltage at conductor 31 equals the voltage at the arm of switch 28. The motor is also mechanically coupled to a dial 35 and, when the input voltage to means 30 is zero, the motor is stopped, and the dial indicates a fraction equal to the voltage applied to the arm of switch 28 divided by the battery voltage $E_0$. Accordingly, as the switch arm is moved successively to its contact points, the values of the mol fractions $x_1, x_2, \ldots, x_n$ are read upon dial 35. Similarly, when switch 22 is in its lower position, the values of mol fractions $y_1, y_2, \ldots, y_n$ are read upon dial 35 as the arm of switch 28 is moved successively to the different contact points.

In the overall operation of the computer, the values of K for the respective components of the mixture are set upon the dials 12 and the total mol fractions of the respective components are set upon the dials 11. If it is desired to determine the mol fractions of the various components in the liquid phase, switch 22 is moved to its upper position and the circuit is balanced by adjustment of crank 13x until galvanometer G reads zero. Thereupon, the correct value of $v$ is read on the dials 13 and the values $x$ of the mol fractions of the components in the liquid phase are read by moving switch 28 to its several positions and observing the readings on dial 35. Thereupon, if desired, switch 22 may be moved to its lower position, and crank 13x adjusted until a null reading is obtained upon the galvanometer. The value of $v$ upon the dials 13 should then agree with the value previously obtained with switch 22 in its upper position. Thereupon, the values of the mol fractions of the components in the vapor phase are read on dial 35 by moving switch 28 successively to its different positions. Of course, the values of $y_1, y_2, \ldots, y_n$ may be obtained simply by multiplying the values of $x_1, x_2, \ldots x_n$ by the equilibrium constants $K_1, K_2, \ldots K_n$, respectively. Thus, the second balancing operation is useful primarily as a check upon the accuracy with which the coefficients were set into the computer.

In Figure 2, I have shown a circuit suitable for use as any of the computer units 10 when neither the equilibrium constant nor total mol fraction of liquid or vapor has an abnormal value. In this figure, parts similar to those described in Figure 1 are indicated by like reference characters. It will be noted that the voltage $E_0$ of battery 15 is applied to one fixed terminal of a potentiometer 37 which is controlled by a dial 11, Figure 1, the other fixed terminal of the potentiometer being grounded at 18. The contactor of potentiometer 37 is connected by a lead 39 to the input circuit of a voltage comparing and amplifying means 40 which corresponds to means 30 of Figure 1. For purposes of explanation, the potentiometer settings are indicated on the figure as fractions, Z representing the fraction of the total resistance of potentiometer 37 between the contactor and ground, while (1—Z) represents the fraction of the total resistance connected between the contactor and the upper fixed terminal of the potentiometer. Thus, if Z equals one-third, the contactor is positioned one-third of the way up from the grounded fixed terminal. The legends applied to other potentiometers in the circuit indicate fractions of the total potentiometer resistances in a manner similar to that already described.

It will be evident, therefore, that the voltage at conductor 39 is Z times the total voltage $E_0$ impressed across potentiometer 37, that is, $ZE_0$.

Conductor 17 also extends to one fixed terminal of a potentiometer 41, the other fixed terminal of which is grounded at 42. The contactor of potentiometer 41 is connected by a lead 43 to one terminal of a reversing switch 14. Conductor 43 also extends to one fixed terminal of a potentiometer 44 which is controlled by a dial 12, Figure 1, the other fixed terminal of potentiometer 44 being grounded at 21. The contactor of potentiometer 44 is connected to a lead 46 which extends to a second terminal of reversing switch 14 and to one fixed terminal of a potentiometer 47 which is controlled by a dial 13, Figure 1, the other fixed terminal of potentiometer 47 being connected to lead 43. The second terminals of reversing switch 14 are connected to output terminals 19 and 20. The contactor of potentiometer 47 is connected by a lead 48 to the input circuit of means 40 and the output of means 40 drives a servomotor 49 which is mechanically connected to the contactor of potentiometer 41.

The arrangement of the described servomechanism including means 40 and motor 49 is such that the motor moves the contactor of potentiometer 41, thereby varying the voltage applied across the network consisting of potentiometers 44 and 47 until the voltage applied to conductor 48 is equal to the voltage applied to conductor 39. When the resultant voltage becomes zero, the voltage at conductor 48 is equal to $ZE_0$, movement of the motor is stopped, and the circuit is balanced.

In accordance with the invention, the resistance of potentiometer 47 is substantially higher than the resistance of potentiometer 44. When I say, in the appended claims, that the potentiometer 44 is of low resistance and the potentiometer 47 is of high resistance, I mean that the resistance of potentiometer 47 is sufficiently high that the current flowing therethrough has a negligible effect upon the voltage at the contactor of potentiometer 44. This result may be accomplished, to any desired degree of accuracy, by proper selection of the ohmic values of potentiometers 44 and 47. Accordingly, the voltage $E_2$ equals $BE_1$. The voltage $ZE_0$ at the contactor of potentiometer 47 is, therefore, equal to That is,
$$ABE_1+(1-A)E_1$$

$$E_1=\frac{ZE_0}{1-A+AB} \quad (5)$$

$$E_2=BE_1=\frac{BZE_0}{1-A+AB} \quad (6)$$

The mol fractions $v$ and $Z$ necessarily lie between zero and one. Hence, there is ordinarily no difficulty in setting these fractions upon the proper potentiometer. However, the equilibrium constant $K$ may vary from a small fraction to a very large number. When $K$ lies between zero and one, it is set as $B$ upon the potentiometer 44 and the mol fraction $v$ is represented by $A$. Thus, substituting $A=v$, $B=K$ in Equations 5 and 6 gives $$E_1=\frac{ZE_0}{1+v(K-1)}=E_0x_1 \quad (7)$$

$$E_2=\frac{KZE_0}{1+v(K-1)}=E_0y_1 \quad (8)$$

These output voltages appear at the terminals 19 and 20, respectively, and are the same as set forth in connection with Figure 1 so that the computer unit of Figure 2 functions in the manner already described as any of the computer units 10 in Figure 1, provided, however, that the value of $K$ for any such unit is within the range of zero to one.

Where the value of $K$ for a particular component is greater than one, the potentiometer 44 is set to the value $$B=\frac{1}{K}$$

and the setting of potentiometer 47 represents the value $A=1-v$. Substituting these values in Equations 5 and 6 gives $$E_1=\frac{KZE_0}{1+v(K-1)}=E_0y_1 \quad (9)$$

$$E_2=\frac{ZE_0}{1+v(K-1)}=E_0x_1 \quad (10)$$

It will be noted that this circuit operates in precisely the same manner as already described except that the potential $y_1E_0$ appears as voltage $E_1$ instead of voltage $E_2$ while the potential $x_1E_0$ appears as voltage $E_2$ instead of as voltage $E_1$. When one or more components has a value of $K$ greater than one, reversing switch 14 is positioned in the one or more corresponding units 10 so that the voltage $E_0x_1$ appears at terminal 19 and the voltage $E_0y_1$ appears at terminal 20, as described in connection with Figure 1. This reversing switch should also incorporate a unit for reversing the connections to the fixed contacts of potentiometer 47, which unit is not shown on the drawing for purposes of simplicity. In this connection, it will be noted that all the potentiometers 47 of the several computer units are ganged and operated by crank 13x together with dials 13. However, $A$ represents $v$ when the equilibrium constant is less than one whereas $A$ represents $(1-v)$ when the equilibrium constant is greater than one. When the connections to the fixed contacts of potentiometer 47 are reversed as in the case of an equilibrium constant greater than one, the "V" scale of the potentiometer of this unit is consistent with the "V" scale of the other potentiometers.

As previously explained, the dials 13, which control the potentiometers 47 of the respective computer units, are moved in unison when the circuit of Figure 1 is balanced. Such movement of potentiometer 47, Figure 2, produces a continuous and automatic rebalancing of the circuit of Figure 2 in accordance with the movement of crank 13x. The speed of operation of motor 49 is such that there is no discernible lag between the movement of dials 13 and the subsequent rebalancing of the computer unit circuits.

When the circuit of Figure 2 is balanced, it will be noted that a voltage from potentiometer 41 is supplied to the network including potentiometers 44 and 47 across potentiometer 44. The function of potentiometer 47 is to pick off a preselected portion of the voltage existing between the contactor of potentiometer 44 and lead 43 whose voltage is derived from potentiometer 41, the voltage thus picked up being compared with a reference voltage developed across potentiometer 37 to produce a voltage difference which, through the medium of means 40 and motor 49, adjusts the voltage supplied to the potentiometer network 44, 47 until the voltage difference between leads 39 and 48 is eliminated. It will be evident to those skilled in the art that this principle of operation is applicable to various types of computers, other than a vapor-liquid equilibrium computer.

The computer unit of Figure 2 is sufficient for the great majority of components found in the usual equilibrium mixture of vapor and liquid. However, there are some special cases where the computer unit of Figure 2 is somewhat insensitive. For example, if the equilibrium constant of a particular component approaches zero and the total mol fraction of the mixture in the vapor phase approaches one, the denominator of the vapor equilibrium equation approaches zero and the circuits are somewhat insensitive. This corresponds physically to a mixture where one component is practically involatile and nearly all the remainder of the mixture is in the vapor phase. In accordance with my invention, the computer unit for any such component is made more sensitive in the region of interest in the manner illustrated by Figure 3.

In Figure 3, conductor 17 is connected to one fixed terminal of a potentiometer 52, the other fixed terminal of which is grounded at 18, the contactor of potentiometer 52 being connected by a lead 54 to means 40, motor 49, and potentiometer 41 in the manner described in connection with Figure 2. A potentiometer 55 has one fixed terminal grounded and its other fixed terminal connected to conductor 43, the contactor of potentiometer 55 being connected by a lead 56 to one fixed terminal of a potentiometer 57, the other fixed terminal of which is connected to a lead 58. The contactor of potentiometer 57 is connected by a lead 59 to the input circuit of means 40. A potentiometer 60 has one fixed terminal connected to conductor 43 and its other fixed terminal grounded, the contactor of the potentiometer being connected through a lead 61 and a fixed resistance 62 to lead 58. A fixed resistance 63 is connected between conductors 43 and 58.

The potentiometer 52 is set to represent $$\frac{fZ}{2}$$

so that the voltage at lead 54 is $$\frac{fZE_0}{2}$$

where $f$ represents a scale factor for increasing the sensitivity of the potentiometers. Means 40 and motor 49 operate, in conjunction with potentiometer 41, in the manner described in connection with Figure 2 to vary the voltage at conductor 43 until the voltage at conductor 59 is equal to $$\frac{fZE_0}{2}$$

the same as the voltage at lead 54. The ohmic values of potentiometer 57 and fixed resistors 62 and 63 are high as compared with the ohmic values of potentiometers 55 and 60 with the result that the small current flow through the first mentioned resistors has a negligible effect upon the voltages at conductors 56 and 61. Accordingly, the voltage at conductor 61 is $MV_1$, where $V_1$ is the voltage at conductor 43, while the voltage at conductor 56 is $DV_1$. Preferably, fixed resistance 62 has one-half the ohmic value of potentiometer 57 while resistance 63 has one-third the ohmic value of potentiometer 57. Furthermore, assuming that the voltage at conductor 58 is $V_2$, the current $$\frac{(DV_1-V_2)}{R}$$

through potentiometer 57 plus the current $$\frac{(V_1-V_2)}{R/3}$$

through resistance 63 equals the current $$\frac{(V_2-MV_1)}{R/2}$$

through resistance 62. Thus, $$V_1(3+D+2M)=6V_2 \tag{11}$$

Furthermore, the voltage $V_3$ at the contactor of potentiometer 57 may be represented by the following equation:

$$V_3=CV_2+(1-C)DV_1 \tag{12}$$

Solving Equations 11 and 12 for $V_1$ yields the following expression:

$$V_1=\frac{6V_3}{3C+6D-5CD+2MC} \tag{13}$$

In this circuit, potentiometer 57 is set so that $C=f(1-v)$. As stated, $v$ is approximately equal to one so that the small difference between $v$ and one is multiplied by the factor $f$, which may be 10, 100 or 1,000, thus making it possible to set this number upon potentiometer 57 with much greater ease and accuracy. Potentiometer 55 is set so that $$D=\frac{fK}{2}$$

whereby K which is, as stated, closely equal to zero, is multiplied by the factor $$\frac{f}{2}$$

thus making it much easier to set potentiometer 55. Potentiometer 60 is set so that $M=(1.25f-1.5)K$, and $V_3$, of course, is equal to $$\frac{fZE_0}{2}$$

Substituting these values in Equation 13, we have, $$V_1=\frac{ZE_0}{1+V(K-1)}=x_1E_0 \tag{14}$$

This voltage is applied through a switch 43a to a terminal 19 of Figure 1, and the unit of Figure 3 is used for each component having a value of K close to zero where the value of $v$ is close to one. Thus, the circuit permits the described values of $v$ and K to be set with a much higher degree of accuracy while still producing the same output at terminal 19 as the unit of Figure 2. It will be noted that there is no point upon the network of Figure 3 where the potential is equal to $y_1E_0$. Thus, when one or more of the units of Figure 3 is utilized in the computer of Figure 1, the values of $y$, the mol fraction in the vapor phase of the various components, cannot be read from the computer. However, these values may be readily obtained merely by multiplying each value of $x$, for example $x_1$, by its corresponding value of K, for example $K_1$.

It will be further noted, in connection with Figure 3, that the setting C of potentiometer 57 corresponding, by proper choice of the direction of shaft rotation, to the setting $A=v$ of potentiometer 47 of Figure 2 is $fv$. This would prevent proper joint adjustment of the potentiometers of the several computer units by the crank 13x, since the potentiometer 57 would have to be rotated $f$ times as fast as potentiometer 47 of Figure 2 to produce a corresponding change in the fraction represented thereby. This difficulty can be overcome by gearing the potentiometers 47 to the crank in such fashion that the contactor movement is $f$ times as fast as contactor movement of the potentiometers 57 of the computer units of Figure 3. Alternatively, the same result may be accomplished electrically by substituting the circuit of Figure 4 for the potentiometer 47 of Figure 2. This circuit includes a potentiometer 65 of the same ohmic value as the potentiometer 47 in Figure 2. Assuming that the resistance of this potentiometer is R, it is shunted by a fixed resistance 66 having an ohmic value of $$\frac{R}{f-1}$$

these shunted resistances being connected in series with a fixed resistance 67 having an ohmic value of $$\frac{(f-1)R}{f}$$

The total resistance of this combination is R but the resistance between the contactor of potentiometer 65 and the lower end of resistor 67 varies from $$\frac{(f-1)R}{f}$$

to R. Thus, if $f$ equals 10, for example, the full scale movement of potentiometer 65 produces a resistance variation from 0.9R to R. The spread of the potentiometer over the upper tenth of its range is multiplied by ten and the potentiometer must be moved ten times as fast as before to produce a corresponding change in resistance. In general, where the resistances have the values stated, full scale movement of the potentiometer arm produces a change in resistance of $$\frac{R}{f}$$

Accordingly, when the circuit of Figure 4 is substituted for the potentiometer 47 of Figure 2, movement of crank 13x produces equal changes in the magnitude of $v$ in the Figure 2 units and the Figure 3 units so that the overall operation of the circuit of Figure 1 is unchanged. The above relationship, of course, holds only when a negligible current is drawn from the contactor of the potentiometer.

The function of the resistances 60, 62 and 63 in the described circuit is to provide a voltage at conductor 58 equal to $$\frac{V_1}{2}(1+fK-K)$$

When this voltage is provided, it will be seen that the circuit functions in a manner analogous of that of Figure 2. That is, a preselected fraction of a voltage existing between the contactor of potentiometer 55 and a preselected point 58 connected in circuit with the voltage supply conductor 43 by potentiometer 60 and resistances 62 and 63 is compared by means 40 with a reference voltage derived from potentiometer 52 to produce a resultant voltage, the servomechanism including motor 49 adjusting the voltage supply from potentiometer 41 to the resistance network until the resultant voltage across means 40 becomes zero. The voltage $$\frac{V_1}{2}(1+fK-K)$$

may be derived from other circuits without departing from the spirit and scope of the invention. Furthermore, the values of resistors 62, 63 may be varied and the circuit will still produce the desired voltage at conductor 58, although the setting of the potentiometer at M will, in general, be more complicated.

The circuit of Figure 3 is also effective to increase the sensitivity of a computer unit where the equilibrium constant of the component under consideration becomes very large and $v$, the mol fraction of vapor in the entire mixture, approaches zero, corresponding physically to the case where the component under consideration is extremely volatile but most of the mixture is the liquid phase. In this case, potentiometer 57 is set so that $C=fv$. Since $v$ is nearly equal to zero, its value is multiplied by the factor $f$ thus making it much easier to set this particular value upon the potentiometer. Potentiometer 55 is set so that $$D=\frac{f}{2K}$$

Since K is very large $$\frac{1}{K}$$

is a small fraction which is multiplied by the factor $$\frac{f}{2}$$

thus making this small fraction much easier to set upon the potentiometer. Potentiometer 60 is set so that $$M=\left(\frac{1.25f-1.5}{K}\right)$$

Substituting these values in Equation (13) gives $$V_1=\frac{KZE_0}{1+V(K-1)}=y_1E_0 \qquad (15)$$

In this case, the voltage at lead 43 is representative of the percentage of the components in the vapor phase, rather than in the liquid phase. Accordingly, the voltage is applied to a terminal 20 of Figure 1 by a switch 43b. When this circuit is used, there is no point on the circuit corresponding to the value of $x_1$ so that the value of $x_1$ cannot be read from the ordinary circuits of the computer. In this case, the value of $x_1$ is obtained by dividing the value of $y_1$ by $K_1$. It will be noted that in this case, also, it is necessary to spread the settings of the potentiometer 47 of the Figure 2 units, so that all the potentiometers 47, 57 may be actuated jointly by crank 13x. This may be done mechanically or by substituting for each of the potentiometers 47 a unit similar to that of Figure 4 except that resistance 67 is positioned at the top rather than at the bottom of the shunted components 65, 66. Thus, the spreading occurs over the lower part of the potentiometer range, rather than over the upper part, as in Figure 4.

The function of the resistances 60, 62 and 63 in the last described unit is to provide a voltage at conductor 58 equal to $$\frac{V_1}{2}\left(1+\frac{f}{K}+\frac{1}{K}\right)$$

When this voltage is provided, it will be seen that the circuit functions in a manner analogous of that of Figure 2. That is, a preselected fraction of a voltage existing between the contactor of potentiometer 55 and a preselected point 58 connected in circuit with the voltage supply conductor 43 by potentiometer 60 and resistances 62 and 63 is compared at the amplifier 40 with a reference voltage derived from potentiometer 52 to produce a resultant voltage, the servomechanism including motor 49 adjusting the voltage supply to the resistance network until the resultant voltage across the input to means 40 becomes zero. The voltage $$\frac{V_1}{2}\left(1+\frac{f}{K}+\frac{1}{K}\right)$$

may be derived from other circuits without departing from the spirit and scope of the invention.

Thus, although the circuit of Figure 2 enables the computer to function properly for practically all values of K and V, the circuit of Figure 3 enables the computer to be used also in special cases where the circuit of Figure 2 is somewhat insensitive. In some cases, where a special value of K is encountered for a particular component, the sensitivity-increasing circuit of Figure 4 may be substituted for the potentiometer 44 without making any other changes in the apparatus, thus enabling the particular equilibrium constant of the component of interest to be set with greater accuracy. This also applies to potentiometer 37 in case very small or very large values of Z should be encountered. It will be evident, therefore, that the circuit of Figure 4, which increases the spread of a potentiometer over a preselected portion of its range by a factor $f$, has utility independently of the computer circuits described herein.

While the invention has been described in connection with present preferred embodiments thereof, it is to be understood that this description is illustrative only and is not intended to limit the invention.

I claim:

1. An electrical computer comprising, in combination, a voltage source; a plurality of units, each of said units comprising a first potentiometer having the end terminals thereof connected across said voltage source, a second potentiometer having the end terminals thereof connected across said voltage source, a third potentiometer having one end terminal thereof connected to the contactor of said second potentiometer and the second end terminal thereof connected to a point of reference potential, a fourth potentiometer having one end terminal thereof connected to the contactor of said third potentiometer and having the second end terminal thereof connected to the contactor of said second potentiometer, means for comparing the potentials at the contactors of said first and fourth potentiometers, means under control of said comparing means to vary the contactor setting of said second potentiometer until there is zero potential difference between the contactors of said first and fourth potentiometers, an output terminal, and switching means to connect said output terminal selectively to the contactors of said second and third potentiometers; means to vary the contactor settings of the fourth potentiometers in each of said units in unison; means to sum the potentials from said output terminals of each of said units; means connected to said voltage source to establish a potential of magnitude equal to the magnitude of said voltage source divided by the number of said units; and means for comparing said last-mentioned potential with the summed potentials.

2. The combination in accordance with claim 1 further comprising a multi-position switch, the contacts of which are connected, respectively, to output terminals of said units, an adjustable means for providing a voltage, a reversible motor having its drive shaft connected to said adjustable means to adjust said voltage, means for applying the adjusted voltage and the voltage applied through said switch to the input terminals of said motor in opposition, and means to indicate the magnitude of the adjusted voltage.

3. An electrical computer comprising, in combination, a voltage source; a plurality of units, each of said units comprising a first potentiometer having the end terminals thereof connected across said voltage source, a second potentiometer having the end terminals thereof connected across said voltage source, a third potentiometer having one end terminal thereof connected to the contactor of said second potentiometer and the second end terminal thereof connected to a point of reference potential, a fourth potentiometer having one end terminal thereof connected to the contactor of said second potentiometer and having the second end terminal thereof connected to said point of reference potential, a first resistor having one end terminal thereof connected to the contactor of said second potentiometer, a second resistor having the first end terminal thereof connected to the second end terminal of said first resistor and having the second end terminal thereof connected to the contactor of said fourth potentiometer, a fifth potentiometer having one end terminal thereof connected to the contactor of said third potentiometer and having the second end terminal thereof connected to the second terminal of said first resistor, means for comparing the potentials at the contactors of said first and fifth potentiometers, means under control of said comparing means to vary the contactor setting of said second potentiometer until there is a zero potential difference between the contactors of said first and fifth potentiometers, an output terminal connected to the contactor of said second potentiometer; means to vary the contactor settings of the fifth potentiometers in each of said units in unison; means to sum the potentials from said output terminals in each of said units; means connected to said voltage source to establish a potential of magnitude equal to the magnitude of said voltage source divided by the number of said units; and means for comparing said last-mentioned potential with the summed potentials.

4. The combination in accordance with claim 3 further comprising a multi-position switch, the contacts of which are connected, respectively, to output terminals of said units, an adjustable means for providing a voltage, a reversible motor having its drive shaft connected to said adjustable means to adjust said voltage, means for applying the adjusted voltage and the voltage applied through said switch to the input terminals of said motor in opposition, and means to indicate the magnitude of the adjusted voltage.

5. The combination in accordance with claim 1 further comprising, a first resistor connected in series with said third potentiometer, and a second resistor connected in shunt with said third potentiometer, the ohmic value of said first resistor being $$\frac{f-1}{f} \cdot R$$

and the ohmic value of said second resistor being $$\frac{R}{f-1}$$

where R is the total resistance of said third potentiometer and $f$ is the factor by which the spread of said third potentiometer is to be increased.

6. In a computer for determining the total fraction of vapor in a vapor-liquid mixture at equilibrium, in combination, a plurality of $n$ circuits corresponding, respectively, to the several components of said mixture, each of said circuits having a first branch that includes a first variable impedance element representative of a function of the total fraction z of a particular component of the mixture, a second branch that includes a second variable impedance element representative of a function of the equilibrium constant K of the particular component of the mixture, and further includes a third variable impedance element representative of the fraction of vapor $v$ in the mixture; means for adjusting simultaneously said last mentioned $v$-representative impedances of all of said circuits; means for applying a reference potential $E_0$ to said first and second branches in all of said circuits; and means to balance the first branch of each circuit against the second branch of each circuit when said means for adjusting is operated and to produce an output signal when the said balance is achieved, said output signal having a potential equal to $$\frac{zE_0}{1+(K-1)v}$$

means for adding the output potentials of said plurality of circuits; means for establishing a second reference potential $$\frac{E_0}{n}$$

and means for comparing said second reference potential with the sum of said output potentials.

7. In a computer for determining the total fraction of vapor in a vapor-liquid mixture at equilibrium, in combination, a plurality of $n$ circuits corresponding, respectively, to the several components of said mixture, each of said circuits having a first branch that includes a first variable impedance element representative of a function of the total fraction z of a particular component of the mixture; a second branch that includes a second variable impedance element representative of a function of the equilibrium constant K of the particular component of the mixture; and further includes a third variable impedance element representative of the fraction of vapor $v$ in the mixture; means for adjusting simultaneously said last mentioned $v$-representative impedances of all of said circuits; means for applying a reference potential $E_0$ to said first and second branches in all of said circuits; and means to balance the first branch of each circuit against the second branch of each circuit when said means for adjusting is operated and to produce an output signal when the said balance is achieved, said output signal having a potential equal to $$\frac{zE_0}{1+(K-1)v}$$

a plurality of resistors having first terminals connected to the outputs of said circuits, respectively; a conductor connected to the second end terminals of said resistors; a potentiometer connected to said reference potential to establish a second reference potential of magnitude $$\frac{E_0}{n}$$

and means for comparing said second reference potential with the potential at said conductor.

8. An electrical computer comprising, in combination, a voltage source; a plurality of units, each of said units comprising a first potentiometer having the end terminals thereof connected across said voltage source, a second potentiometer having the end terminals thereof connected across said voltage source, a third potentiometer having one end terminal thereof connected to the contactor of said second potentiometer and the second end terminal thereof connected to a point of reference potential, a fourth potentiometer, means for comparing the potentials at the contactors of said first and fourth potentiometers, means under control of said comparing means to vary the contactor setting of said second potentiometer until there is zero potential difference between the contactors of said first and fourth potentiometers, and an output terminal connected to the contactor of said second potentiometer; at least one of said units having a first end terminal of said fourth potentiometer connected to the contactor of said second potentiometer; at least one of the other units having a fifth potentiometer with one end terminal connected to the contactor of said second potentiometer and having the second end terminal connected to reference potential; means to connect the contactor of said fifth potentiometer to said first end terminal of said fourth potentiometer in said at least one of the other units; means to vary the contactor settings of all said fourth potentiometers in unison, including a means for causing adjustment of said fourth potentiometers in all of said at least one units in proportion to the adjustment of all of said at least one of the other units; means to sum the potentials from said output terminals of each of said units; means connected to said source to establish a potential of magnitude equal to the magnitude of said voltage source divided by the number of said units; and means for comparing the current accompanying said last-mentioned potential with the summed currents.

9. The combination in accordance with claim 7 wherein at least one of said first, second and third impedance elements comprises another potentiometer, a first resistor connected in series with said another potentiometer, and a second resistor connected in shunt with said another potentiometer, the ohmic value of said first resistor being $$\frac{f-1}{f} \cdot R$$

and the ohmic value of said second resistor being $$\frac{R}{f-1}$$

where R is the total resistance of said another potentiometer and $f$ is the factor by which the spread of said another potentiometer is to be increased.

10. In a computer wherein electrical outputs of a plurality of units are summed, each unit providing an output voltage equal to the product of a common voltage source and the mol fraction of a component in one phase in a vapor-liquid equilibrium mixture wherein the outputs of each of said units are regulated by a single control representing the total mol fraction of the mixture in one of the phases, a voltage balancing circuit including a conductor; means for connecting each of said units to said conductor thereby to make said conductor common to the outputs of each of said units; means for applying a balance voltage to said common conductor of magnitude equal to said common voltage divided by the number of said units; current indicating means connected between said balance voltage and said common conductor; a multi-position switch, the contacts of which are connected, respectively, to output terminals of said units; an adjustable means for providing a voltage; a reversible motor having its drive shaft connected to said adjustable means to adjust the last-said voltage; means for applying the last-said voltage and the voltage applied to said switch to the input terminals of said motor in opposition; and means to indicate the magnitude of the last-said voltage.

References Cited in the file of this patent

UNITED STATES PATENTS

| | | |
|---|---|---|
| 1,858,267 | Eames | May 17, 1932 |
| 2,453,462 | Seller | Nov. 9, 1948 |
| 2,503,387 | Hartwig | Apr. 11, 1950 |
| 2,538,226 | Anderson et al. | Jan. 16, 1951 |
| 2,545,655 | Doyle et al. | Mar. 30, 1951 |
| 2,558,430 | Goldberg | June 26, 1951 |
| 2,603,968 | Muskrat | Mar. 10, 1953 |
| 2,659,234 | Harrison | Nov. 17, 1953 |

FOREIGN PATENTS

| | | |
|---|---|---|
| 365,216 | Italy | Nov. 26, 1938 |

OTHER REFERENCES

Electronic Analog Computers (Korn and Korn), published by McGraw-Hill Book Co., New York, 1952, page 120.